United States Patent [19]
Guzzetta

[11] Patent Number: 4,610,461
[45] Date of Patent: Sep. 9, 1986

[54] STEERING SYSTEM FOR ELIMINATION OF BUMP STEERING IN INDEPENDENT WHEEL SUSPENSION SYSTEMS

[76] Inventor: Matthew Guzzetta, 7565 North Ave., Lemon Grove, Calif. 92045

[21] Appl. No.: 745,530

[22] Filed: Jun. 17, 1985

[51] Int. Cl.⁴ ............................................. B60G 3/20
[52] U.S. Cl. .................... 280/660; 280/668; 280/691
[58] Field of Search ............... 280/95 R, 95 A, 664, 280/660–663, 665–667, 673–675, 691–696, 669–672

[56] References Cited

U.S. PATENT DOCUMENTS

| | | | |
|---|---|---|---|
| 2,115,919 | 5/1938 | Slack | 280/696 |
| 2,652,263 | 9/1953 | Varnum | 280/666 |
| 4,145,072 | 3/1979 | Matschinsky | 280/668 |

FOREIGN PATENT DOCUMENTS

| | | | |
|---|---|---|---|
| 146537 | 7/1936 | Austria | 280/670 |
| 661249 | 7/1929 | France | 280/669 |
| 268728 | 10/1929 | Italy | 280/669 |

Primary Examiner—John J. Love
Assistant Examiner—Everett G. Diederiks, Jr.
Attorney, Agent, or Firm—Frank D. Gilliam

[57] ABSTRACT

A steering and suspension mechanism for a wheeled vehicle incorporating bump steer control. The mechanism comprises a pair of spaced apart universal joints one of which is fixedly located and the other positionably supporting the wheel axle. A spacer member positions the universal joints at a selected spaced relationship. A rotatable steering shaft is connected to one side of the fixed in position universal joint. The center of the opposite side of the fixed in position universal joint is pivotally connected to one end of the spacer. The other end of the spacer is connected to the center of one side of the wheel axle supporting universal joint. The opposite side of the wheel supporting universal joint is connected to the wheel supporting axle. In one embodiment a tie rod is pivotally connected off center and adjacent to the spacer member on each universal joint through a ball connection. An attachment between the wheel axle and frame provides additional support thereto.

11 Claims, 6 Drawing Figures

STEERING SYSTEM FOR ELIMINATION OF BUMP STEERING IN INDEPENDENT WHEEL SUSPENSION SYSTEMS

BACKGROUND OF THE INVENTION

The invention is directed to an independent suspension system for a wheeled vehicle and more particularly to a steerable independent suspension mechanism for a wheeled vehicle having bump steer control.

An undesirable condition exists in all independently suspended linkage steering mechanisms. This condition is commonly referred to as "bump steering." In effect, the toe in setting of a given wheel changes when the wheel is caused to move vertically resulting in steering changes from the driver input.

In *How to Make Your Car Handle* by Fred Puhn copyrighted in 1976 by H. P. Books, P.O. Box 5367, Tucson, Ariz. 85703 (602/888-2150) explains bump steer and a tool for checking same. This article teaches that bump steer on the front suspension of most cars is adjusted by changing the height of one end of the steering tie rods. This applies to cars with conventional double A-arm independent front suspension or Mac Pherson strut front suspension. The article further notes that this adjustment is not suited to street use for various reasons.

*Motorcyclist* magazine of November, 1984 in an article titled "Radd/Parker Suspension Prototype" teaches at page 64, that hydraulic steering eliminates bump steer, but adds unwanted damping to the steering system. The article teaches that bump steering can be eliminated, at least on a motorcycle, by the use of a telescoping shaft that goes straight to a conventional set of handlebars. There are no teachings for use of this telescoping shaft in a conventional steerable swing arm suspension system. Further, it is well known that telescoping shafts are inherently weak for a given dimension when compared with a rigid shaft.

In the April, 1985 *Cycle World* magazine, at page 60, an article titled "Taming the TESI" teaches the use of opposing hydraulic actuators to control steering and bump steering. The same teachings are set forth in the March, 1985 *Cycle* magazine at page 99.

A degree of bump steering can be found in all vehicles employing swing axle steerable suspensions.

The eliminating of bump steering is highly desirable both for racing vehicles and vehicles designed for street use. The elimination of bump steering has not been successfully achieved in automobiles, motorcycles and the like prior to the emergence of the instant invention.

SUMMARY OF THE INVENTION

This invention is directed to a novel use of a pair of universal joints which are incorporated between the steering support and the wheel support in a steerable swing arm suspension system. The use of the universal joints allows the wheel to move vertically without affecting the driver wheel steering direction input. The wheel is free to move vertically without effectively changing the length of any of the steering linkage.

A conventional pitman arm is connected to a steering mechanism which rotates the pitman arm according to driver steering directional inputs. The pitman arm is connected to a shaft which is rotatably supported by a bracket or the like fixedly connected to the chassis or frame of the vehicle. The opposite end of the shaft is connected to the center of one side of a single universal joint. The opposite side of the universal joint is centrally connected through a stub shaft to a suspension arm or spacer member. The opposite end of the suspension arm is similarly attached centrally to one side of a second universal joint. A steering means, such as a tie rod is connected to the same sides of the universal joints but its pivotal connections spaced from the center of the respective universal joints to provide steering leverage. The tie rod connections are through conventional pivotal ball joints normally employed in swing arm suspension systems. It should be understood that sprocket/chain combinations and the like connected in a manner equivalent to the tie rod can be employed to practice the invention. The opposite end of the second universal joint is connected to a steering spindle (king pin or the like) which supports the wheel axle. An additional support means interconnected to the vehicle frame is provided for additionally supporting positioning the steering mechanism.

An object of this invention is to provide a steerable suspension system for a motor vehicle which eliminates bump steering.

Another object of this invention is to provide a bump steer free steerable suspension system that operates vehicle steering in a normal manner.

Another object of this invention is to provide a bump steer free steerable suspension system for a motor vehicle which employs Mac Pherson struts.

Still another object of this invention is to eliminate bump steering by the use of inexpensive and readily available components.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
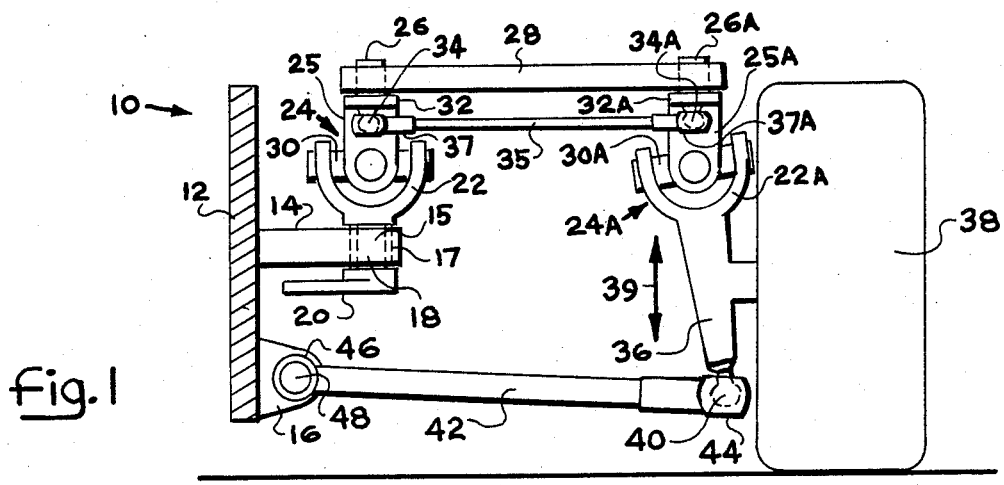
FIG. 1 is a schematic showing of a first embodiment of the invention for one side of a vehicle.

FIG. 1 is a schematic showing of one side of a motor vehicle employing independent steerable suspension 10. The device is supported by vehicle frame or sturdy fixed structure 12. The suspension system 10 is interconnected to the structure 12 through support members 14 and 16. Support member 14 has an aperture 15 with a bushing 17 (shown in phantom) for receiving steering shaft 18. The lower end of steering shaft 18 has a pitman arm 20 fixedly attached thereto. The rotation of the pitman arm 20 by a vehicle steering mechanism (not shown) generally operator controlled, rotates the attached steering shaft 18. It should be understood that the pitman arm is shown by way of example and not by way of limitation as steering means such as, handle bars, remotely operated sprockets and the like for the purpose of vehicle steering could be used equally as well to practice the invention. Fixedly attached to the opposite end of the steering shaft 18 and centrally positioned thereon is one side 22 of a single universal joint 24. The opposite side 25 of the universal joint 24 is centrally and pivotally connected through stub shaft 26 to a spacing bar 28. It should be understood that the single universal joints used and described herein have a central uniform pivot shaft 30 which allows both sides of the universal joint to pivot relative to each other in a conventional and expected manner. Any type of universal joints can be used to practice the invention. A bracket 32 is connected to and extends outwardly from the side 25 of the universal joint 24, this can be best seen in FIG. 2. Rotatably connected to the bracket 32 is a conventional male ball joint 34.

The opposite end of spacing bar 28 is likewise connected to side 25A of a similar single universal joint 24A which has the identical features as universal joint 24. Interconnected between the make ball joints 34 and 34A is a tie rod 35 with ball sockets 37 at each end. The tie rod and ball socket connection is freely pivotal in a conventional and expected manner. For example, if single universal joint 24 is caused to rotate universal joint 24A will follow regardless of its vertical relative position along the direction of arrow 39.

Attached to side 22A of universal joint 24A is a steering spindle or king pin 36. Centrally located on the steering spindle 36 is a wheel axle which rotatably supports wheel and tire 38. Attached to the lower end of the steering spindle 36 is a ball stud 40. Connected between the ball stud 40 and the frame 12 is a suspension supporting member 42. The ball stud end 44 has a ball socket connection and the opposite end 46 is pivotally attached through fixed pivot connector 48 to the frame 12. These connections allow the steering spindle to be rotated via pitman arm 20 through the ball socket connector at 44 and allowed to travel along the direction of arrow 39 in a vertical position.

It can be seen that regardless of the angular or vertical position of the wheel 38 relative to the frame 12 the effective length of the steering elements remained unchanged, especially tie rod 35, thereby eliminating any steering inputs due to the vertical or angular position of the wheel 38 relative to the frame 12.

Figure 2:
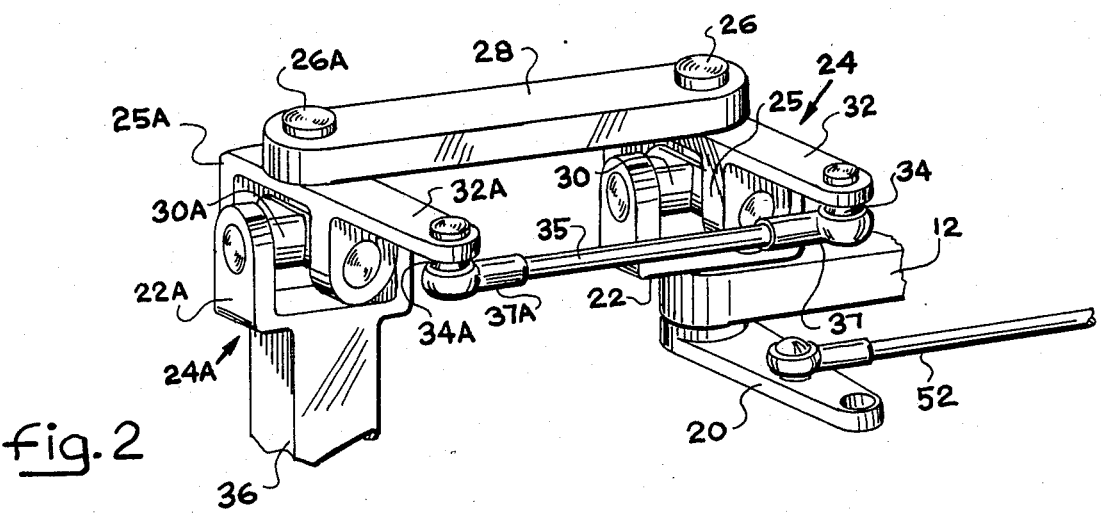
FIG. 2 is a perspective partial showing in elevation of the side of the vehicle opposite from the embodiment of FIG. 1.

FIG. 2 is a perspective showing of the pitman arm, frame support bracket, tie rod and universal joints of the opposite side of the vehicle from the FIG. 1 showing.

Figure 3:
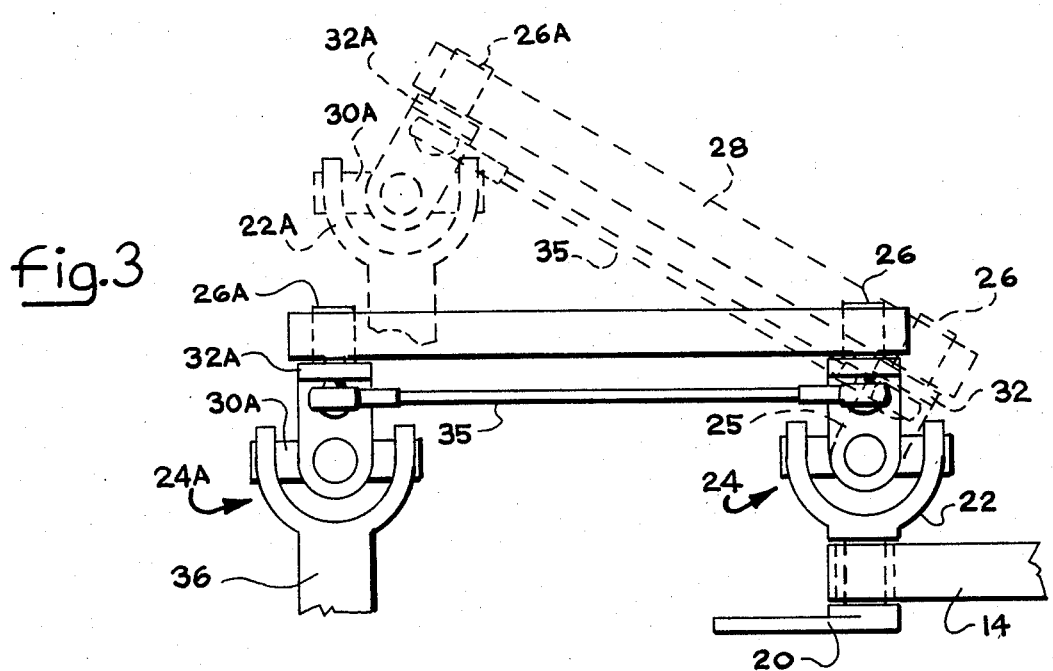
FIG. 3 is a side view of the FIG. 2 showing a rest and a vertical displaced positioning of the elements of the embodiment of FIG. 1.

FIG. 3 depicts the embodiment of FIGS. 1 and 2 in a normal and vertical displaced position (in phantom) resulting from wheel displacement. This showing further establishes that the effective length of the steering mechanism of the invention does not change in length with vertical displacement thereby preventing any bump steering.

In the FIGS. 1-3, schematic showing of the steering mechanism is shown located on the upper surface of the suspension system with the tie rod located vertically below the spacer bar 28.

Figure 4:
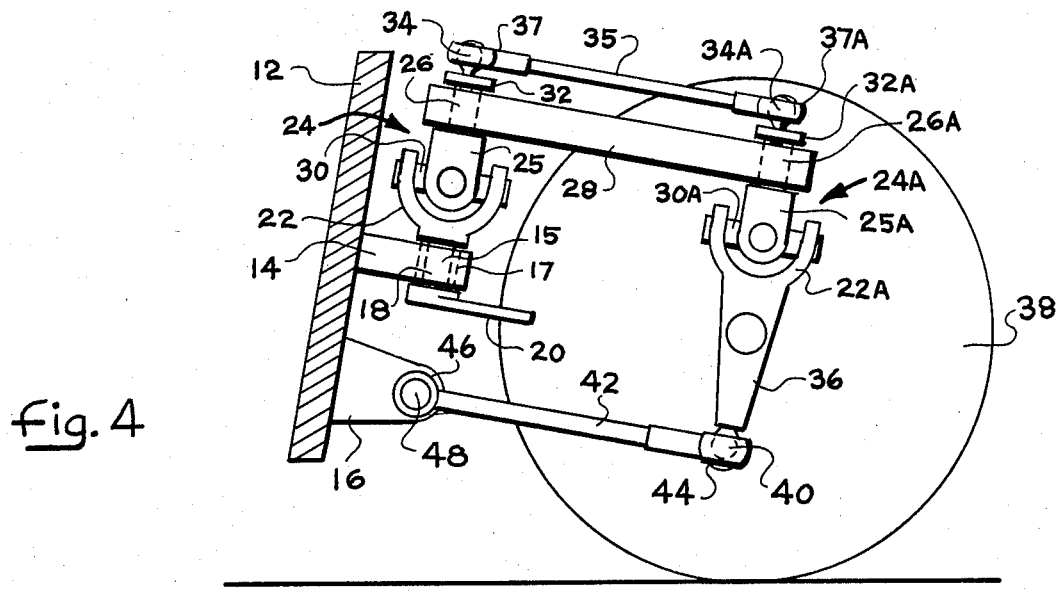
FIG. 4 is a side schematic showing of a second embodiment of the invention.

FIG. 4 shows an embodiment similar to the FIGS. 1-3 showing with the tie rod elevated vertically above the spacing bar 28.

Figure 5:
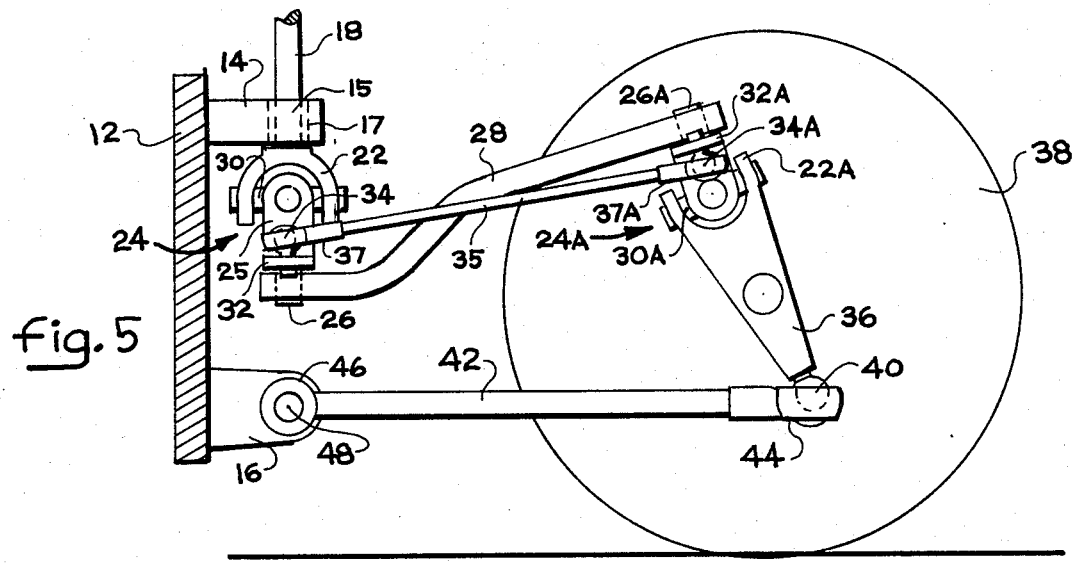
FIG. 5 is a side schematic showing of a third embodiment of the invention.

FIG. 5 depicts a third embodiment of the invention directed to use for a single wheel steerable independent suspension system such as that used on a motorcycle or the like. In this embodiment, the pitman arm and a portion of the tie rod are elevated vertically above the spacing bar 28 and the wheel is extended from and positioned parallel with the frame support 12. The system functions as hereinabove described.

Figure 6:
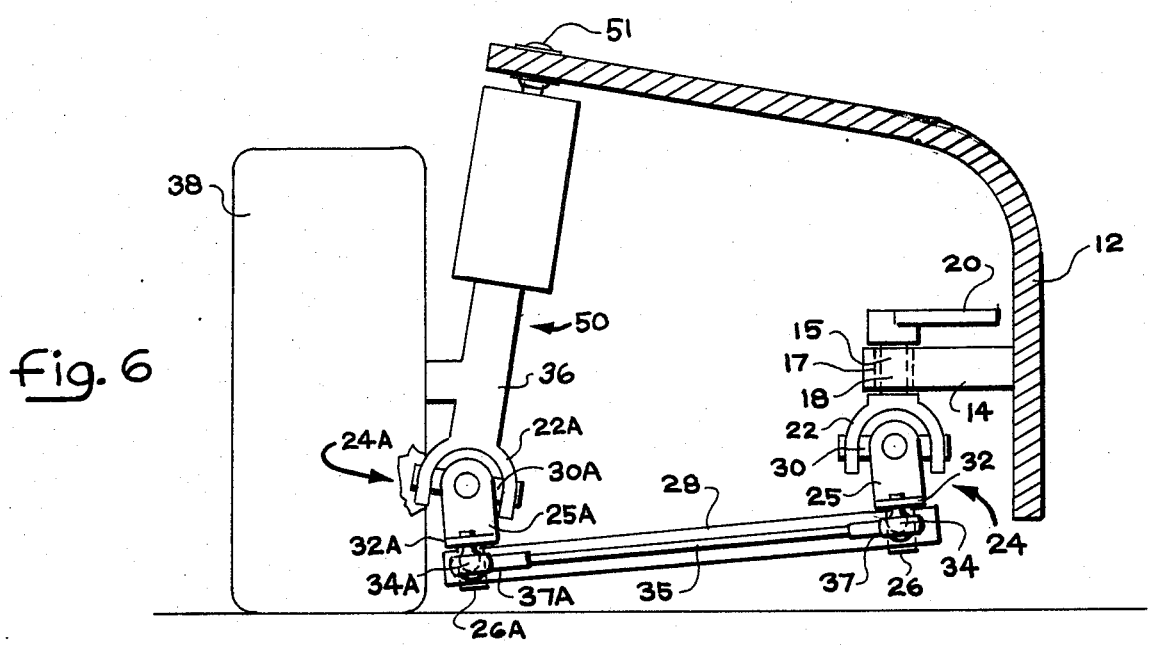
FIG. 6 is a side schematic showing of a fourth embodiment of the invention.

Referring now to the FIG. 6 embodiment, in this Fig. the steering components are positioned vertically below the frame support 12 and the frame support 16 is replaced by a Mac Pherson strut 50. One end of the strut 50 is connected to the upper portion of wheel spindle 36 and the opposite end is pivotally connected to the vehicle frame 12 through pivot 51.

Throughout the various embodiments and showings, the effective length of the steering mechanism remains constant due to the effect of the series universal joints.

It should be understood that pairs of independently suspended steerable wheel assemblies can be employed for conventional vehicles by attaching a second ball stud on brackets 20, (see FIG. 2), by extending a track rod 52 similar to tie rod 35 therebetween whereby movement of the pitman arm 20 would be relayed to a second pitman arm in the same manner as the steerable wheel.

It can therefore be seen from the above that the invention provides an improved steering system for an independently suspended steerable wheel which eliminates bump steering.

Although the teachings of the invention have herein been discussed with reference to specific theories and embodiments, it is to be understood that these are by way of illustration only and that others may wish to utilize the invention in different designs or applications.

What is claimed is:

1. An independent suspension for a steerable wheel comprising:
   a rotatably positionable steering member;
   first and second universal joints each having first and second relatively rotatable elements;
   a steering shaft interconnecting said steering member and the center of said first rotatable element of said first universal joint;
   a spacer means pivotally attached at one end to the center of the second rotatable element of said first universal joint and pivotally attached at its other end to the center of the first rotatable element of said second universal joint;
   steering means connected at one end to the second rotatable element of said first universal joint and connected at its other end to the first rotatable element of said second universal joint;
   a steering spindle connected at one end to the second rotatable element of said second universal joint; and
   an axle attached to said steering spindle for rotatably supporting said wheel thereon.

2. The invention as defined in claim 1 wherein said steering member is a pitman arm fixedly attached to said steering shaft.

3. The invention as defined in claim 1 further comprising a means for supporting said steering shaft and said steering spindle.

4. The invention as defined in claim 3 wherein said means for supporting and steering shaft comprises a fixedly positioned bracket with an aperture through which tthe steering shaft is rotatably supported.

5. The invention as defined in claim 3 wherein said means for supporting said spindle comprises an arm pivotly attached to a fixedly positioned pivot at one end and to said steering spindle through a ball joint at its other end.

6. The invention as defined in claim 3 wherein said means for supporting said steering shaft and said spindle comprise a fixedly positioned bracket with an aperture through which the steering shaft is rotatably supported and an arm pivotally attached to a fixedly positioned pivot at one end and to said steering spindle through a ball joint at its other end whereby said steering spindle is free to rotate and move vertically.

7. The invention as defined in claim 3 wherein said means for supporting said steering shaft comprises a fixedly positioned bracket with an aperture through which the steering shaft is rotatably supported and means for supporting said spindle is a Mac Pherson strut connected between the spindle and a fixed element whereby rotational and vertical movement of said spindle is unrestrained.

8. The invention as defined in claim 1 wherein said spacer means is positioned vertically above said universal joints.

9. The invention as defined in claim 1 wherein said spacer means is positioned vertically lower than said universal joints.

10. The invention as defined in claim 1 wherein said steering means is a tie rod and the rod connections to said universal joints is a ball joint connection.

11. The invention as defined in claim 1 wherein said steering means is a tie rod spaced from the vertical center of said universal joints.

* * * * *